A. WENGER.
ATTACHMENT FOR WIPERS OR SQUEEGEES.
APPLICATION FILED JULY 22, 1921.

1,413,441.  Patented Apr. 18, 1922.

WITNESSES
H. J. Walker
Hugh H. Ott

INVENTOR
AARON WENGER
BY
ATTORNEYS

UNITED STATES PATENT OFFICE.

AARON WENGER, OF BAYONNE, NEW JERSEY.

ATTACHMENT FOR WIPERS OR SQUEEGEES.

1,413,441.  Specification of Letters Patent.  Patented Apr. 18, 1922.

Application filed July 22, 1921. Serial No. 486,781.

*To all whom it may concern:*

Be it known that I, AARON WENGER, a citizen of the United States, and a resident of Bayonne, in the county of Hudson and State of New Jersey, have invented a new and Improved Attachment for Wipers or Squeegees, of which the following is a full, clear, and exact description.

This invention relates to an attachment for wiper strips or squeegees, the same being particularly designed for use in connection with wiper members of the kind employed in connection with floor oiling machines as set forth in my co-pending application, Serial No. 431,004, filed December 15, 1920.

The invention contemplates an attachment especially designed for use in connection with felt strips used as wiper members for the purpose of giving to the same a resilient backing to insure the proper contact of the same throughout their length with the surface to be wiped.

The invention is also useful in connection with other wiper members or squeegees in order to give to the same the proper elasticity or resiliency.

As a further object, the invention contemplates a device of the character described which is extremely simple in construction, inexpensive to manufacture, and which is thoroughly reliable and highly efficient in its purpose.

With these and other objects in view, the invention resides in the novel construction, combination and arrangement of parts set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed and by variations in the phraseology of the same.

In the drawing—

Figure 1:
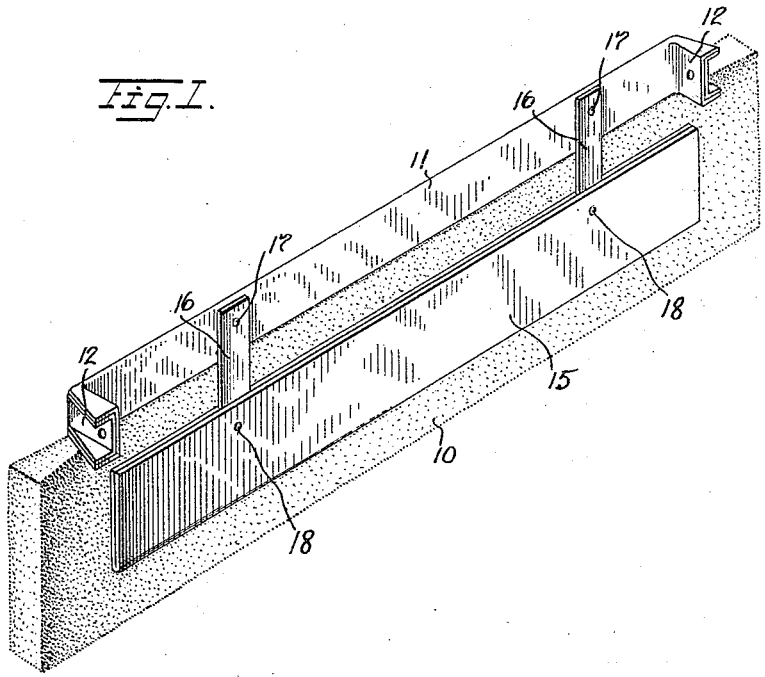
Figure 1 is a perspective view illustrating a wiper member equipped with a backing attachment constructed in accordance with the invention.
Figure 2:
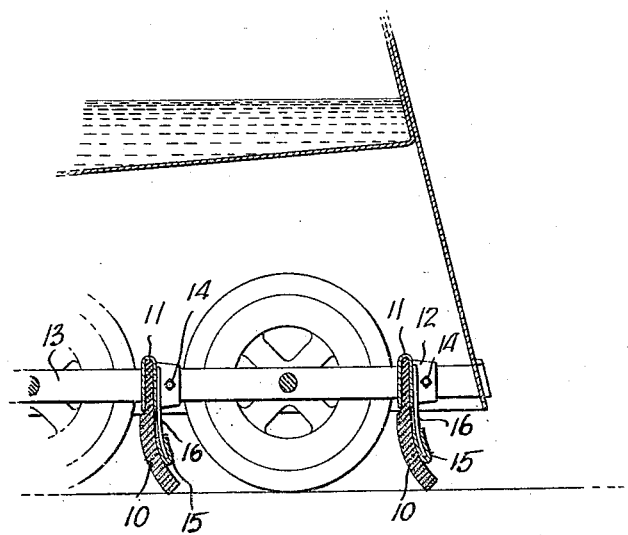
Fig. 2 is a fragmentary longitudinal sectional view through a floor oiling machine illustrating the wiper members thereof equipped with backing devices constructed in accordance with the invention.

Referring to the drawings by characters of reference, 10 designates the wiper member consisting of a felt strip clamped at its upper end between a metallic inverted U-shaped channel member 11 which is preferably bent rearwardly at its opposite ends at a right angle to the major portion of its length to provide apertured attaching lugs 12 which embrace the longitudinal frame bars 13 of the machine and receive the securing bolts 14 to dispose the strips transversely of the machine and the path of travel of the same. In order to augment and impart to the felt wiper member 10 the desired resiliency or elasticity, the backing member is employed which consists of a strip 15 preferably of metal provided with spaced upstanding spring arms 16 which are secured at their free ends as at 17 to the members 11 whereby to dispose the strip 15 in parallel relation and preferably at the rear of the wiper member 10. In the embodiment as illustrated, the strip 15 is preferably constructed from a sheet of material bent upon itself in substantially U-form and be-between the leaves of which the ends of the spring arms are received and retained by the fastening elements or rivets 18.

In use and operation the spring arm 16 will permit of the rearward flexing of the felt wiper member and will effect through the transverse strip 15 the frictional engagement or impingement of the lower edge of the wiper member against the surface to insure its proper co-operation therewith.

It is, of course, to be understood that if desired a backing member may be secured to the wiper member on either side of the same where the wiper member is designed to be used in connection with a machine or for a purpose where the same will be moved in opposite directions such as in the case of an ordinary squeegee for cleaning windows or the like.

Having thus described my invention, what I claim is:

1. As a new article of manufacture, a wiper or squeegee construction embodying a wiper member, a channel member embracing one edge thereof, and a backing member comprising a strip of material and spaced resilient arms connecting said strip to the channel member.

2. The combination with a squeegee or wiper including a wiper member and a channeled supporting member embracing one edge thereof, of means attached to one edge of the supporting member and arranged parallel to one side of the wiper member to engage and coact therewith for effecting the impingement of the active edge of the wiper member with the surface over which it is operated, comprising a strip of material bent in a U-form, and spaced resilient arms secured respectively at its opposite ends to the supporting member and between the U-shaped strip.

3. The combination with a wiper member comprising a felt strip having a reinforcement at one edge provided with attaching lugs at its opposite extremities of a backing member therefor comprising a strip of rigid material arranged parallel to one side surface of the wiper member, and spaced spring arms projecting from one edge of said rigid strip and secured to the reinforced edge of the wiper member for resiliently effecting the engagement of the wiper member with the surface upon which it is operated.

AARON WENGER.